June 8, 1926.
K. E. PEILER
1,587,985
FEEDING MOLD CHARGES OF MOLTEN GLASS
Filed March 31, 1921    2 Sheets-Sheet 1
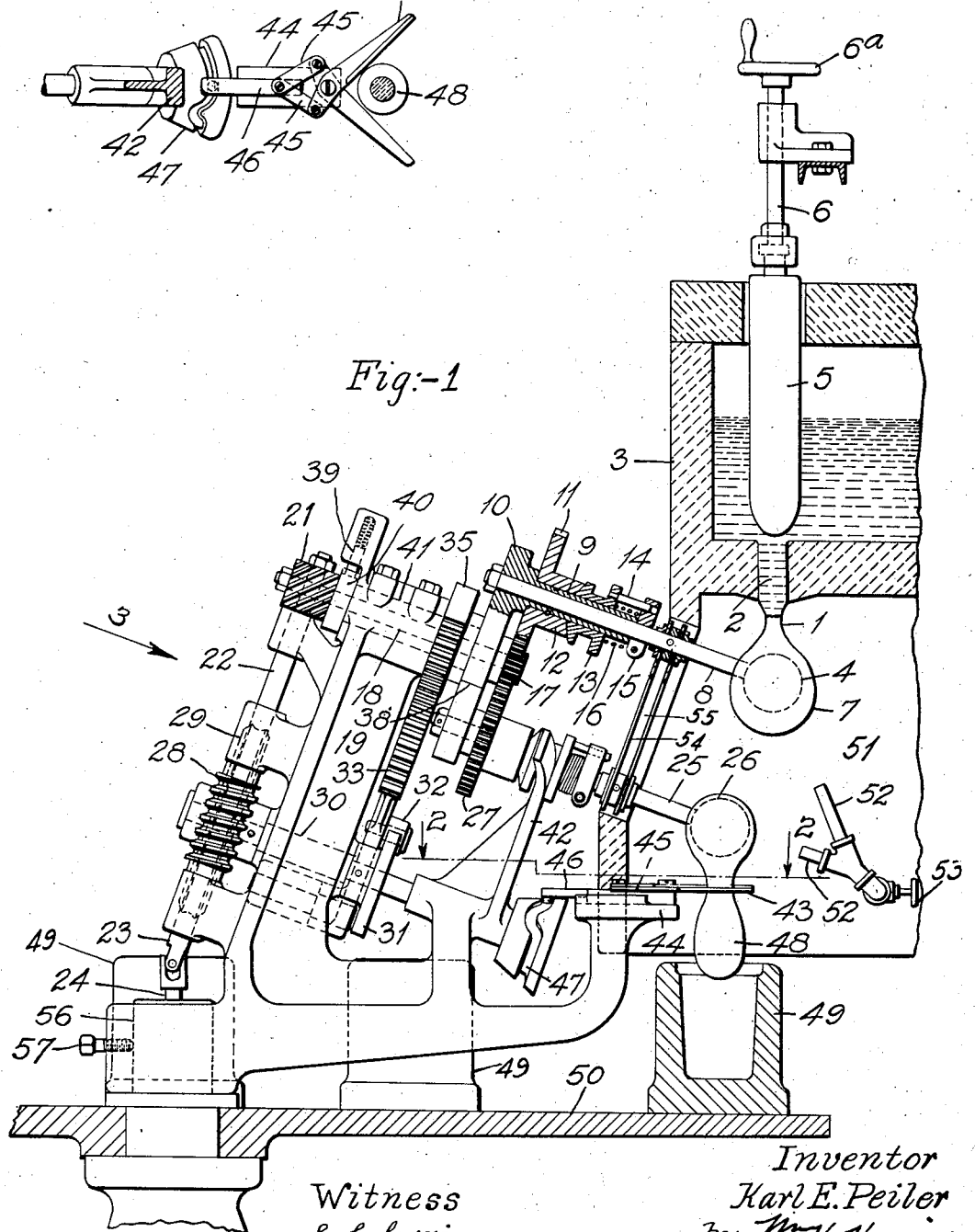
Witness
E. L. Jarvis
Inventor
Karl E. Peiler
by W. H. Honiss
Atty June 8, 1926.
K. E. PEILER
1,587,985
FEEDING MOLD CHARGES OF MOLTEN GLASS
Filed March 31, 1921   2 Sheets-Sheet 2
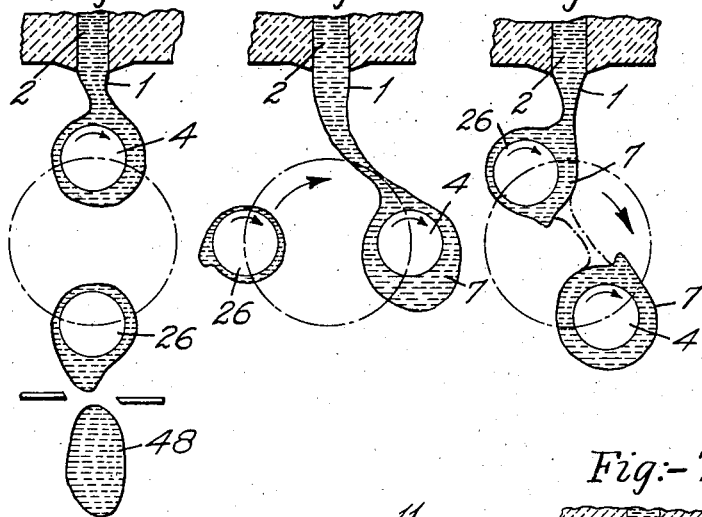
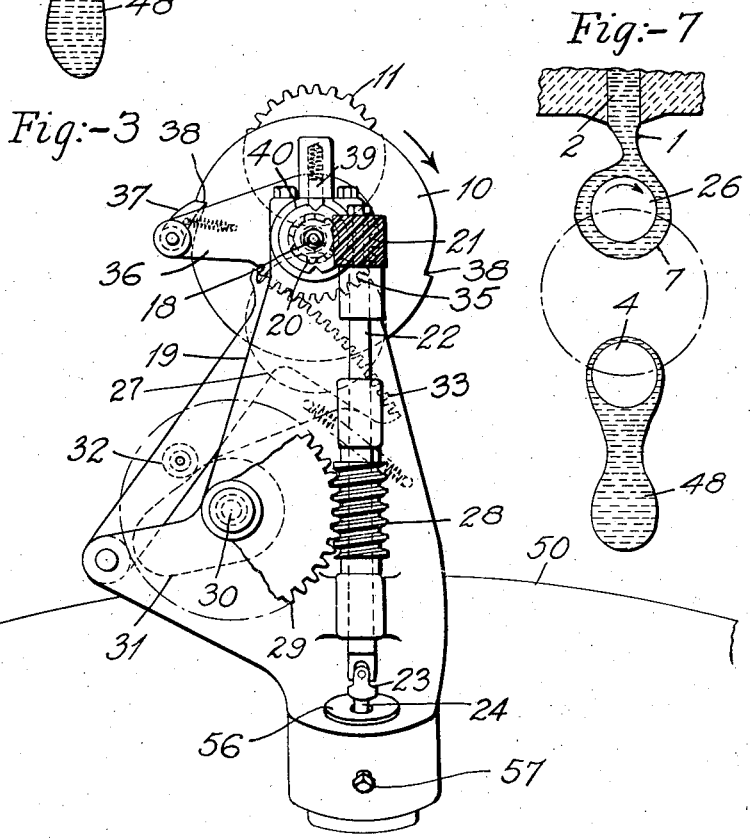
Witness
E. L. Jarvis
Inventor
Karl E. Peiler
by
Atty Patented June 8, 1926.

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

FEEDING MOLD CHARGES OF MOLTEN GLASS.

Application filed March 31, 1921. Serial No. 457,298.

This invention relates to a novel method of feeding molten glass, in separated masses or gathers, in suitable plastic condition for subsequent shaping operations, and to an apparatus for carrying out that method. More specifically, this invention relates to glass feeders in which gathering implements of a punty type are operated to accumulate thereon gathers of molten glass as the latter flows from a furnace or other receptacle, and to discharge these accumulations or gathers when they have reached a predetermined size. This invention is a further development of the basic inventions embodied in my co-pending applications, Serial No. 713,143, filed August 3, 1912 and in a division thereof Serial No. 82,654, filed March 7, 1916.

One object of this invention is to attain an increased production, and this is accomplished by the use of a series of punties, two being shown in this case, although a larger number can be used if desired, each of which, after accumulating its gather, is moved away from its gathering position, and discharges its gather at another position while the next punty is accumulating its succeeding gather.

Another object of this invention is to separate the successive accumulations of glass from each other by pulling them apart and winding up the resultant stub ends, thus avoiding the necessity of using any shearing mechanism for this purpose.

A further object of this invention is to cause the punties to operate in regular time and succession, one gathering its glass while another is discharging its gather to suitable shaping mechanism.

The invention also provides means for gathering and discharging the glass in a heated atmosphere to avoid chilling it, said means including a heated chamber and a rotary heat shield to close its working opening.

The particular embodiment of mechanism herein shown and described for carrying out the method comprises an organized machine, in which a plurality of gathering implements or punties are mounted for a translatory movement upon a suitable support or carrier, by which they are successively and periodically presented in the line of flow of the molten glass issuing from a suitable furnace or other feeding means, obtain therefrom gathers of glass of uniform mass, move away therefrom, and deliver mold charges to suitable mechanism for further treatment.

The accompanying drawings, in connection with the following description, disclose a new method and a preferred apparatus for performing this method, although various other forms of mechanical arrangements within the scope of the appended claims might be used.

Figure 1 is a side elevation, partly in section, showing the said apparatus in operative position relative to a glass furnace which is delivering molten glass in a flowing stream.

Fig. 2 is a horizontal section taken on the line 2—2 of Fig. 1, with certain parts omitted, and shows the shear operating mechanism in detail.

Fig. 3 is an end view looking in the direction of the arrow 3 in Fig. 1.

Figs. 4–7 are cross sections through the punties and the discharge opening in the successive positions occupied by the punties during a complete cycle of their translatory movements and illustrate diagrammatically their drawing-out and winding-up action.

In the embodiment of the invention shown herein, the molten glass 1 flows, preferably in a stream, from an orifice 2, in the bottom of the forehearth 3, of an ordinary furnace. The rate of flow is regulated by a gate 5, having screw 6 and hand wheel 6ª for raising and lowering it.

The glass flows on the head 4 of a rotating punty 8 and forms a gather 7 thereon. That punty is then moved away, and another punty 25 is moved into its place, so that the glass flows onto the head 26. These punties are operated successively and automatically by mechanism described below, so that one is gathering glass while the other is discharging a mold charge from its gather into suitable shaping mechanism.

The punties are journaled for rotation in hubs 9 of a disc 10, the sleeve 41 of which is journaled in the frame 19. Mounted on hubs 9 are gears 11 and 27, whose hubs 12 conform with cone clutches 13, each of which carries a driving pin 14 sliding in a collar 15 rigidly mounted on each punty, thus rotating that punty when its clutch is held in engagement with its hub 12 by a coiled spring 16. Gears 11 and 27 are driven by pinion 17, on shaft 18, which is journaled in sleeve 41 of the disc 10 and rotated by spiral gears 20 and 21, the latter being mounted on the main drive shaft 22, which is journaled in suitable bearings on frame 19 and connected by flexible joint 23 and shaft 24 with any suitable source of power.

On the lower end of shaft 22 is worm 28, which engages worm wheel 29 on shaft 30, the latter also carrying cam 31 which actuates roll 32, on sector 33 pivoted to frame 19, the sector meshing with a segment gear 35 on arm 36 and oscillating it. A spring pawl 37 pivoted to the arm intermittently engages ratchet teeth 38 on disc 10, rotating the latter and revolving the punties around the axis of shaft 18, to successively bring them into the gathering and discharging positions. The disc 10 is held stationary, while the pawl and sector make their return strokes, by spring detent 39, which engages oppositely disposed notches in an index collar 40, on the sleeve 41 of the disc 10. The axes of the punties 8 and 25 are preferably inclined to tilt the heads of the punties downwardly, thus facilitating the retention of the gathered glass thereon, and insuring a uniform discharging position therefrom.

The rotation of the punties is stopped by the action of a fixed clutch cam 42, having a curved end which successively engages the clutches 13 as they are revolved to their lower discharging position, pulling them out of engagement with hubs 12, and stopping the rotation of the corresponding punty. As each punty revolves away from its discharging position, its clutch is released from clutch cam 42 and spring 16 causes its reengagement with its hub 12, to again rotate that punty as it approaches its gathering position.

The shear operating mechanism comprises a pair of shear blades 43 fulcrumed on a bracket 44, and having their ends pivoted to toggle joint 45, the other end of the latter being pivoted to slide 46 whose pin engages with cam 47 on shaft 30. This cam is shaped to close the shears and sever a mold charge when the latter has been properly formed, as in Fig. 1, allowing it to drop into a mold 49, or other suitable shaping mechanism, on the table 50 of a shaping machine. The shear mechanism is arranged to operate in suitable time relation to the punty-carrying disc 10.

The gathering and severing operations are effected in a heated chamber 51, which may extend down so far as desired, and whose temperature is regulated by one or more burners 52, of any well-known kind, valves 53 being provided for controlling the supply of air and gas to the burners. To prevent heat escaping from chamber 51, it is closed with a shield 54, revolving with the punties and consisting of two plates spaced apart to provide an air cell 55 and having openings through which the punties project into the chamber 51.

The gathering position of the punties may be adjusted, to bring them directly underneath or at either side of the stream, by swinging bracket 44 on its vertical axial center 56, and securing it by any well-known means, as set screw 57. The table 50 may be rotated intermittently and stopped at its stations by any well-known driving mechanism.

The apparatus operates as follows:

Each punty, when in the upper position shown in Figs. 1 and 4, remains under the stream of glass and rotates until the required mass of glass is gathered. Then the disc 10 is turned a half revolution by the cam 31 and its ratchet connection, thus carrying the loaded punty to its lower discharging position and bringing the discharged punty to its gathering position. During this movement the stream of glass is drawn out as shown in Fig. 5, and is wound upon the succeeding punty when the latter is brought into contact with the stream. The cord of glass momentarily connecting the two punties (as indicated by the dot and dash lines of Fig. 6) is quickly pulled apart, and its resultant ends are wound upon the respective punties. As these ends are not chilled by contact with shears or otherwise, they are promptly absorbed into their respective gathers. Upon reaching the lower discharging position shown in Figs. 1 and 7, all movement of the punty is stopped, allowing the glass to settle down and form a pendant mass from which a mold charge is then separated, either by its own weight, or by shears as shown in Fig. 1. The latter method is preferable for insuring greater uniformity in the weight of the mold charges, and regularity of time, the latter being especially desirable when the molds are operated automatically. The stub of glass left on the punty by the severing of the mold charge is wound upon the punty and enclosed by the hot glass of the succeeding gather as shown in Fig. 7, thus reheating and reabsorbing any chill left by the severing operation. The heat of the enclosing chamber, augmented if desired by the burners 52, produces and maintains the desired temperature environment in which the punties operate.

For a machine having more than two punties, the arc through which they are revolved by each rotation of cam 31 would equal the angle between them.

Modifications in the arrangement, size, speed and other characteristics of the invention may be made, to vary the size of the mold charges or adapt the invention to other conditions of use.

I claim as my invention:—

1. The method of gathering molten glass from a flowing stream, which consists in winding the glass upon itself to accumulate a gather, and then separating the accumulated gather from the stream by moving it out of the line of flow.

2. The method of forming a mold charge of molten glass from a flowing stream, which consists in winding the stream upon itself to form a gather, pulling the gather away and separating it from the stream, stopping the winding action and suspending the gather, and severing a mold charge from the suspended gather.

3. The method of obtaining mold charges of molten glass from a flowing stream, which consists in successively winding the end of the stream upon itself to form a gather, moving the gather away from the flowing stream to separate it therefrom, suspending the gather by stopping the winding action, and severing a mold charge from the suspended gather.

4. The method of feeding molten glass, which consists in flowing a supply of molten glass onto a succession of rotating gathering implements and separating the gathers by pulling their connecting cords apart.

5. The method of feeding molten glass, which consists in flowing a supply of molten glass onto a succession of gathering implements, separating the gathers by pulling their connecting cords apart, and winding the separated stub ends upon the gathering implements and absorbing them into the respective gathers.

6. The process of obtaining gathers of glass, which consists in moving a gathering implement into contact with a flowing stream of glass, rotating the implement to accumulate a gather of glass thereon, moving the implement out of contact with the stream to separate the gather therefrom, and moving another gathering implement into contact with the stream to similarly accumulate a gather of glass thereon from the next following portion of the stream.

7. The method of feeding molten glass, which comprises the steps of catching the out-flow from a glass furnace on a succession of punties, rotating the punties to distribute and retain gathers thereon, revolving the punties out of the line of flow of the glass to separate the gathers therefrom and from each other, and discharging mold charges from the gathers.

8. In apparatus for feeding molten glass, the combination of a carrier, a plurality of gathering implements mounted side by side thereon, means for revolving the carrier to successively position each gathering implement in contact with a supply of molten glass to obtain a gather of glass therefrom, and then position the charged implement out of contact with the supply at a discharging position for delivering a mold charge from its gather, and means for rotating each implement when in contact with the supply.

9. In apparatus for feeding molten glass, the combination of a plurality of punties, means for accumulating gathers of molten glass thereon from a flowing stream of molten glass, and means for separating the successive accumulations of glass from each other by pulling them apart, independently of any shearing mechanism.

10. In apparatus for feeding molten glass, provided with a working chamber, a revoluble heat shield adapted to close one side of the chamber, and a gathering implement projecting through the shield into the chamber.

11. In apparatus for feeding molten glass, having a working chamber, a heat shield adapted to close one side of the chamber, a plurality of gathering implements projecting through the shield into the chamber, and means for revolving the implements and the shield.

Signed at Hartford, Conn., this 28th day of March, 1921.

KARL E. PEILER.